United States Patent [19]

Campbell et al.

[11] Patent Number: 5,536,445
[45] Date of Patent: Jul. 16, 1996

[54] SURFACTANT AND DISPERSIBLE OR EMULSIFIABLE COMPOSITIONS EMPLOYING SURFACTANT

[75] Inventors: Frederick Campbell, Failsworth; John D. Schofield, Bury; Alan S. Baker, Slough, all of England

[73] Assignee: Zeneca Limted, London, England

[21] Appl. No.: 165,828

[22] Filed: Dec. 14, 1993

Related U.S. Application Data

[62] Division of Ser. No. 70,676, Jul. 6, 1987, Pat. No. 5,300,255, which is a continuation of Ser. No. 707,473, Mar. 1, 1985, abandoned.

[30] Foreign Application Priority Data

| Mar. 21, 1984 | [GB] | United Kingdom | 8407301 |
| Apr. 26, 1984 | [GB] | United Kingdom | 8410664 |
| Oct. 25, 1984 | [GB] | United Kingdom | 8426995 |
| Dec. 13, 1984 | [GB] | United Kingdom | 8431459 |

[51] Int. Cl.$^6$ ............... B01J 13/00; C07C 305/02; C11C 3/00
[52] U.S. Cl. ............... 252/308; 252/312; 252/363.5; 252/62.55; 252/62.56; 252/351; 106/499; 106/504; 71/DIG. 1; 554/44; 558/20; 558/34
[58] Field of Search ............... 554/44; 558/20, 558/34; 106/499, 504; 252/351, 313.1, 309, 312, 308, 363.5; 560/55

[56] References Cited

U.S. PATENT DOCUMENTS

| 1,823,815 | 9/1931 | Bertsch | 252/353 |
| 2,023,769 | 12/1935 | Ott et al. | 252/353 |
| 3,778,287 | 12/1973 | Stansfield | 106/499 |
| 3,996,059 | 12/1976 | Stansfield et al. | 106/308 N |
| 4,057,436 | 11/1977 | Davies et al. | 106/288 Q |
| 4,309,176 | 1/1982 | Friese et al. | 252/8.57 |
| 4,415,705 | 11/1983 | Hutter | 525/167.5 |
| 4,698,099 | 10/1987 | Nakamura et al. | 106/499 |
| 4,704,165 | 11/1987 | Nakamura et al. | 106/499 |
| 5,300,255 | 4/1994 | Campbell et al. | 252/351 |

FOREIGN PATENT DOCUMENTS

| 0127325 | 12/1984 | European Pat. Off. . |
| 2002400 | 1/1982 | United Kingdom . |
| 2116205 | 9/1983 | United Kingdom . |
| 2115002 | 9/1983 | United Kingdom . |
| 2117398 | 4/1985 | United Kingdom . |

OTHER PUBLICATIONS

Derwent Abstracts of EP 424, An 79–08415B/05 (1979).
Derwent Abstracts of EP —26 423, An 81–27629D/16 (1981).

*Primary Examiner*—Richard D. Lovering
*Assistant Examiner*—Daniel S. Metzmaier
*Attorney, Agent, or Firm*—Cushman Darby & Cushman

[57] ABSTRACT

A surfactant comprising a carboxylic acid ester or amide carrying a terminal strong acid group selected from carboxymethyl, sulphate, sulphonate, phosphate and phosphonate, suitable for stabilising dispersions of solids in organic liquids and oil/water emulsions, processes for the preparation of the surfactant and dispersions and emulsions containing the surfactant. A preferred species of the surfactant is a poly(hydroxyalkanecarboxylic acid) having the strong acid group attached, either directly or through a linking group, to a terminal hydroxy or carboxylic acid group.

11 Claims, No Drawings

SURFACTANT AND DISPERSIBLE OR EMULSIFIABLE COMPOSITIONS EMPLOYING SURFACTANT

This is a division of application Ser. No. 07/070,676, filed Jul. 6, 1987, now U.S. Pat. No. 5,300,255, which is a continuation of application Ser. No. 06/707,473, filed Mar. 1, 1985, now abandoned.

This specification describes an invention relating to a compound having utility as a surfactant, to a composition of a solid or an organic liquid and the surfactant, to a dispersion of a solid in an organic liquid containing the surfactant and to an aqueous emulsion containing the surfactant.

The Surfactant

According to a first aspect of the present invention there is provided a compound comprising a carboxylic acid ester or amide carrying a terminal acid group selected from carboxymethyl, sulphate, sulphonate, phosphate and phosphonate, hereinafter referred to as the "acid group". The carboxylic acid ester or amide is preferably an oligo- or poly-ester comprising from 2 to 100 units of one or more hydroxycarboxylic acid monomers.

The term carboxymethyl, that is a group of the formula —$CH_2COO^-$, does not include a carboxymethyl group in which the $CH_2$ group is directly attached to a carbon atom of an unsubstituted hydrocarbon chain containing two or more carbon atoms.

A preferred compound in accordance with the present invention conforms to the general formula:

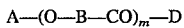

wherein A and D are are groups one of which is or carries the acid group as hereinbefore defined and the other is a convenient terminal group which does not render the compound hydrophilic, B is a hydrocarbon group and m is from 1 to 100.

In the compound of Formula I, when D carries the acid group, A is preferably the residue ($A^1$—CO—) of an esterifiable carboxylic acid of the formula $A^1$—COOH, in which $A^1$ is H, a hydrocarbon or a substituted hydrocarbon. Although $A^1$ is conveniently an optionally substituted alkyl, alkenyl, cycloalkyl or polycycloalkyl group containing up to 50, more preferably up to 35, carbon atoms, it can be any convenient monovalent group. In this case D is preferably a polyvalent, more preferably di- or tri-valent, bridging group linking the acid group to the ester chain, $A^1CO(O$—B—$CO)_m$—, e.g. a group such as $D^2$ defined below. Where D has a valency greater than 2 it may link two or more acid groups to a single ester or two or more esters chain to a single acid group. Where the acid group has more than one valency it may be linked to two or more esters through two bridging groups.

In the compound of Formula I, when A carries the acid group, D is preferably the residue of an alcohol, a thiol or a primary or secondary amine, $D^1$—XH, in which $D^1$ is an aliphatic or alicyclic group of similar character to $A^1$, and X is O, S or NR in which R is H, alkyl, alkenyl, cycloalkyl, or phenyl, in which the alkyl and alkenyl groups contain up to 20 carbon atoms and the cycloalkyl groups from 4 to 8 carbon atoms. In this case A is preferably the acid group itself and where this has more than one valency it may be linked to two or more polyester chains, although A may also be a polyvalent linking group, like D above, linking the acid group to the polyester chain. The hydrocarbon group represented by B, which is preferably an optionally substituted alkyl, alkenyl, cycloalkyl or polycycloalkyl group, preferably contains up to 50, more preferably from 3 to 24, carbon atoms, with at least 3 carbon atoms directly between the —O— and —CO— groups. Optional substitutents for $A^1$, $D^1$ and B include halo, especially chloro, hydroxy, amino, alkoxy and other non-ionic species in so far as they do not make the ester/amide chain hydrophilic in character.

It is preferred that m is from 2 to 75, more preferably 3 to 30, so that the compound of Formula I is an oligo- or poly-ester. Where m=1 it is preferred that the group represented by A or D which is remote from the acid group contains at least 6 carbon atoms and that the surfactant contains at least 12 carbon atoms and more preferably at least 20 carbon atoms.

A first preferred species of the first aspect of the present invention, particularly suitable for use as a surfactant in compositions comprising an oil phase and an aqueous phase, is a compound which comprises a hydrophobic component and a hydrophilic component covalently bonded together, wherein the hydrophobic component is the residue of an oligomeric or polymeric monocarboxylic acid of the formula:

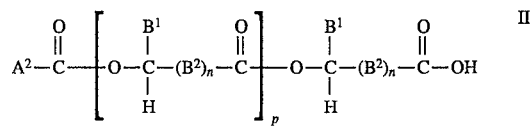

in which $A^2$ is hydrogen or a monovalent hydrocarbon or substituted hydrocarbon group;

$B^1$ is hydrogen or a monovalent $C_1$ to $C_{24}$ hydrocarbon group;

$B^2$ is a divalent $C_1$ to $C_{24}$ hydrocarbon group;

n is zero or 1; and p is zero or an integer up to 100, preferably 2 to 20, and wherein the hydrophilic component contains an anionic grouping selected from phosphate, phosphonate, sulphate, sulphonate and carboxymethyl, i.e. the acid group.

The acid group in the first preferred species may be in the free acid form or as a salt thereof with a base, for example, ammonia, organic bases such as amines and aminoalcohols, and inorganic bases.

The term "oil phase" and "oil" used in respect of the first species and compositions based thereon refers to water-immiscible, preferably non-polar, liquids in general. It is not limited to, though embracing, naturally occurring oils such as hydrocarbons and fatty acid esters.

Where the surfactant of Formula II is designed for use in compositions, particularly oil-water emulsions, containing non-polar organic liquids the compound of Formula II is preferably oil-soluble, that is the oil phase of the composition should be better than a theta solvent for the compound. The significance of the expression "theta solvent" is discussed in "Polymer Handbook" (Ed. Brandrup & Immergut, Interscience, 1966) at pages IV 163–166. Briefly, this definition implies that in a solution of a polymer in a solvent, a solvent which is better than a theta solvent for the polymer, the polymer exists in a non-self-associated condition. The definition is usually satisfied by any liquid which would normally be described as a "good" solvent for the polymer. Considerable variation in the composition of the compound of Formula I, particularly in respect of the nature of the groups $A^2$, $B^1$ and $B^2$, is possible whilst meeting the requirement that the compound should be oil-soluble in the above sense. Generally speaking, the more the oil phase of the composition tends towards a fully aliphatic character, the longer will the hydrocarbon chains of these groups need to be.

A second preferred species of the of the first aspect of the present invention is a compound conforming to the formula:

$$[A^3-CO-(O-B^3-CO)_m-D^2]_k-L\ M \qquad III$$

wherein $A^3$—CO is the residue of an esterifiable carboxylic acid of the formula, $A^3$—COOH;

$B^3$ is selected from alkylene, alkenylene, cycloalkylene, polycycloalkylene and halo derivatives thereof;

$D^2$ is a bridging group of the formula —X—G—Y— wherein X is O, S or NR and Y is O, NR or a direct link, in which each R independently is as hereinbefore defined or, where X and Y are both NR, the two groups, R, may form a single alkylene or alkenylene group linking the two nitrogens to which they are attached, and G is alkylene, alkenylene, cycloalkylene or arylene;

L is phosphonate, sulphonate or methylenecarboxylate;

M is a cation;

k is 1 or 2;

and m is as hereinbefore defined.

A third preferred species of the first aspect of the present invention is a compound conforming to the formula:

$$[D^1-X-(CO-B^3-O)_m]_k-L\ M \qquad IV$$

wherein $D^1$ is an aliphatic or alicyclic group and $B^3$, L, M, X, m and k are as hereinbefore defined.

The residue of the esterifiable carboxylic acid represented by $A^3CO$ in Formula III may be any convenient terminal hydrophobic group for the ester chain, —(O—$B^3$—CO)$_m$, although it is preferably an optionally substituted alkyl, alkenyl, cycloalkyl or polycycloalkyl group containing up to 50 carbon atoms and more preferably from 1 to 35 carbon atoms. The optional substituents are preferably selected from hydroxy, amino, halogen and alkoxy provided $A^3$ retains its hydrophobic character.

The aliphatic or alicyclic group represented by $D^1$ in Formula IV is preferably an optionally substituted alkyl, alkenyl, cycloalkyl or polycycloalkyl group containing up to 35 carbon atoms, the optional substituents being preferably selected from halogen, tertiary amino and alkoxy.

The alkylene, alkenylene, cycloalkylene and polycycloalkylene groups represented by $B^3$ preferably contain from 3 to 35 carbon atoms, more preferably from 5 to 20 carbon atoms, with at least 3 and more preferably at least 5 carbon atoms between the —O— and —CO— groups, and are preferably unsubstituted.

The alkylene and alkenylene groups represented by G preferably contain up to 10 carbon atoms and more preferably from 2 to 6 carbon atoms. The cycloalkylene group represented by G preferably contains from 4 to 8 carbon atoms and especially preferably is 1,4-cyclohexylene. The arylene group represented by G is preferably monocyclic and especially 1,4-phenylene.

The alkyl and alkenyl groups represented by R may contain up to 25 carbon atoms and preferably contain up to 5 carbon atoms. Where two groups, R, form a single group this preferably contains up to 10 carbon atoms.

In the compound of Formula III in which Y is O the acid group, L, is attached to the ester/amide chain through an oxygen atom so that phosphonate and O form phosphate and sulphonate and O form sulphate. Similarly, where Y is NR, phosphonate and NR form phosphorimide and sulphonate and NR form sulponamide.

The cation represented by M is preferably $H^+$, a metal ion, an ammonium ion or a substituted ammonium ion and examples of suitable cations are $Na^+$, $K^+$, $Ca^{2+}$, $NH_4^+$, $N(CH^3)_4^+$ and $NH(CH_3)_4^+$.

Specific examples of the bridging group represented by $D^2$ are —$NHC_2H_4$—, —$OC_2H_4$—, —$OC_2H_4O$—, —$OC_2H_4NH$—, —$NH(CH_2)_nNH$—, wherein n is from 2 to 5, piperazin-1,4-ylene and phen-1,4-ylene-diamino.

Examples of the groups represented by $A^1$, $A^2$ and $A^3$ are methyl, ethyl, $CH_3(CH_2)_4$—, $CH_3(CH_2)_{10}$—, $CH_3(CH_2)_{14}$—, $CH_3(CH_2)_{16}$—, $HO(CH_2)_5$—, $CH_3(CH_2)_7CH=CH(CH_2)_7$—, $CH_3(CH_2)_{28}$—, $CH_3(CH_2)_5CH(OH)(CH_2)_{10}$—, $CH_3(CH_2)_4CH=CHCH_2CH=CH(CH_2)_7$—, $CH_3(CH_2)_5CH(OH)CH_2CH=CH(CH_2)_7$— and $CH_3OCH_2$— and the residue of abietic acid i.e. the radical derived from abietic acid by removal of the carboxyl group.

Examples of the group represented by $D^1$ are methyl, ethyl, $CH_3(CH_2)_9$—, $CH_3(CH_2)_{11}$—, $CH_3(CH_2)_{15}$—, $CH_3(CH_2)_{17}$—, $CH_3(CH_2)_{29}$—, $CH_3(CH_2)_7CH=CH(CH_2)_7$—, $CH_3OCH_2$—, $CH_3(CH_2)_4CH=CHCH_2CH=CH(CH_2)_7$— and the residue of abietyl alcohol, i.e the radical derived from abietyl alcohol by removal of the OH group.

Examples of the groups represented by B and $B^3$ are:

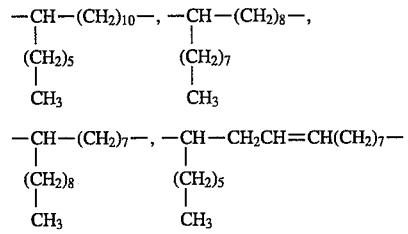

and —$(CH_2)_5$—.

Examples of the groups represented by $B^1$ are H, $C_6H_{13}$, $C_8H_{17}$ and $C_9H_{19}$ and by $B^2$ are —CH—$(CH_2)_{10}$—, —CH—$(CH_2)_8$—, —CH—$(CH_2)_7$—, and —CH—$CH_2CH=CH(CH_2)_7$—.

Compositions Containing the Surfactant

The compounds of the first aspect of the invention, hereinafter referred to as "surfactants" are particularly useful for enhancing the dispersibility of solids in organic media and for stabilising water-in-oil and oil-in-water emulsions.

(i) First Composition

According to a second aspect of the present invention there is provided a composition of a solid and a surfactant according to the first aspect of the invention. The surfactant for use in the first composition is preferably a compound in accordance with Formula III or Formula IV.

The composition of the second aspect, hereinafter referred to as the "first composition", may comprise an intimate mixture of the two components but preferably comprises a coating of the surfactant on finely divided primary particles of the solid which preferably have a mean diameter below 10 microns and more preferably below 5 microns. The composition may be dry, in which case the primary particles may be aggregated, or it may be in the form of a dispersion of the solid in an organic medium, preferably one which is a liquid, or is at least plastic, under normal ambient conditions.

The solid may be any material which it is desired to stabilise in a finely divided state in an organic medium. Examples of suitable solids are pigments for solvent inks and paints; pigments and fillers for plastics materials; dyestuffs, optical brightening agents and textile auxiliaries for solvent dyebaths, inks and other solvent application systems; magnetic solids, especially magnetic metals or alloys and magnetic oxides, for use in the production of magnetic tapes and discs, solids for oil-based and invert-emulsion drilling muds, dirt and soil particles in dry cleaning fluids and biocides, agrochemicals and pharmaceuticals which are applied as dispersions in organic media.

The first composition, whether dry or in the form of a dispersion may contain other ingredients, such as resins, binders, fluidising agents, anti-sedimentation agents, plasticisers and preservatives.

A preferred solid is a pigment from any of the recognised classes of pigments described, for example, in the Third Edition of the Colours Index (1971) and subsequent revisions of, and supplements thereto, under the chapter headed "Pigments".

Examples of inorganic pigments are titanium dioxide, zinc oxide, Prussian blue, cadmium sulphide, iron oxides, vermillion, ultramarine and the chrome pigments, including chromates, molybdates and mixed chromates and sulphates of lead, zinc, barium, calcium, and mixtures and modifications thereof which are commercially available as greenish-yellow to red pigments under the names primrose, lemon, middle, orange, scarlet and red chromes.

Examples of organic pigments are those from the azo, disazo, condensed azo, thioindigo, indanthrone, isoindanthrone, anthraquinone, anthanthrone, isodibenzanthrone, triphendioxazine, phthalocyanine, especially copper phthalocyanine and its nuclear halogenated derivatives, and quinacridone series and also lakes of acid, basic and mordant dyes. Carbon black, although strictly inorganic, behaves more like an organic pigment in non-aqueous dispersions. Preferred organic pigments are phthalocyanines, and especially copper phthalocyanines, monoazos, disazos, indanthrones, anthanthrones, quinacridones and carbon blacks.

Where the solid is a pigment the first composition is compatible with the fluidising agents disclosed in UK Patent Specifications Nos 1508576 and 2108143. The fluidising agent described in UK 1508576 is a substituted ammonium salt of a coloured acid wherein there are from 19 to 60 carbon atoms in at least 3 chains attached to the N atom of the substituted ammonium ion. The fluidising agent described in UK 2108143 is a water-insoluble disazo compound comprising a central divalent group free from acidic and other ionic substituents linked, through azo groups, to two monovalent end groups, one end group being free from acidic and other ionic substituents and the other carrying a single substituted ammonium salt group. Such fluidising agents are useful for enhancing the fluidity of the dispersion form of the first composition.

Examples of magnetic solids include gamma-$Fe_2O_3$, cobalt-doped gamma-$Fe_2O_3$, magnetite, $CrO_2$, Ferrites and particulate iron, cobalt and nickel, and alloys thereof.

Examples of agrochemicals include the fungicides flutriafen, carbendazim, chlorothalonil and mancozeb.

The organic medium may be any organic medium in which it is desired to disperse the solid and with which the surfactant is compatible and at least partially soluble. It is preferably liquid, or at least plastic, at normal ambient temperatures. Examples of suitable media are hydrocarbons and chlorinated hydrocarbons, such as aliphatic petroleum fractions, chloroform, carbon tetrachloride, perchloroethylene, benzene, toluene, xylene and chlorobenzene, alcohols such as n-butanol, ethers such a di-alkylethers and tetrahydrofuran, ketones such as methyl-ethyl-ketone, methyl-i-butyl ketone and cyclohexanone and esters such as butyl acetate and 2-ethoxyethyl acetate. Mixtures of these liquids may be used and, in general, the organic liquid or mixture is selected to meet the requirements of the end-use to which the composition will be put.

The first composition may be prepared by mixing the components or the surfactant may be added to the solid during the preparation of the latter, preferably during the later or finishing stages of preparation. The first composition may also be prepared by subjecting a mixture of the solid, the surfactant, preferably in the organic medium to a grinding operation sufficient to reduce the particle size of the solid to below 10 microns. If the composition includes a liquid organic medium, this may be subsequently removed, e.g. by evaporation, if the composition is required in a dry form.

The first composition preferably contains from 1% to 100% by weight of the dispersing agent, based on the weight of the solid, but more preferably contains from 1% to 30%, on the same basis. In the dispersion form, the first composition preferably contains from 10% to 90% by weight of the solid the precise quantity depending on the nature of the solid and the relative densities of the solid and liquid. For example, dispersions of organic pigments preferably contain from 15% to 60% by weight of pigment whereas dispersions of an inorganic pigments preferably contain from 40% to 90% of the pigment, based on the total weight of the composition.

(ii) Second and Third Compositions

According to a third aspect of the present invention there is provided a composition of a surfactant, in accordance with the first aspect of the invention, and a water-immiscible organic liquid, hereinafter referred to as the "second composition". The second composition may comprise the organic liquid and the surfactant alone or it may be converted to a third composition comprising a water-in-oil or oil-in-water emulsion of the organic liquid and an aqueous medium stabilised with the surfactant. Such an emulsion forms a fourth aspect of the present invention.

Water-immiscible organic liquids which may be satisfactorily emulsified in water with the aid of these surfactants include fatty glycerides, mineral oils, hydrocarbon fuel oils and other liquid hydrocarbons, synthetic lubricants such as the tetra-pelargonate ester of pentaerythritol, bitumens, waxes and polyolefins such as poly(isobutylene). The resulting emulsions are useful, inter alia as hydraulic fluids, cutting oils and other metal-working fluids.

A preferred surfactant for use in the second composition is a compound in accordance with Formula II.

In producing the emulsions, it is generally preferred to add the surfactant to the oil phase before the latter is contacted with the aqueous phase. In cases where it is desired to neutralise the free acidic groups in the surfactant, the base may be introduced before, during or after the blending of the surfactant with the oil phase.

The surfactants of the invention, especially those of Formula II, are advantageous in that they can tolerate water phases which are high in dissolved inorganic content, for example naturally hard waters or brines containing up to saturation levels of salts such as sodium chloride, magnesium chloride or calcium chloride. Those surfactants in which the anionic grouping is derived from phosphoric acid have particularly good tolerance towards the presence of polyvalent cations such as $Ca^{2+}$. A further advantage is that the surfactants do not lose their efficacy at higher temperatures; they perform satisfactorily at temperatures of up to 100° C. or higher.

The proportion of surfactant which is required in a particular oil/water system may vary widely according to the nature of the two phases, but in most instances it will lie in the range 0.1% to 25% by weight, based on the disperse phase of the emulsion.

Preparation of Surfactants

The surfactants of the first aspect of the invention may be prepared by reaction between a polyester having a terminal carboxylic acid and/or hydroxy group and a compound having group reactive therewith and carrying a terminal acid group. Alternatively the polyester may be reacted directly with a precursor of the acid group or with a bifunctional compound which is subsequently reacted with a precursor of the acid group. Preferred polyesters are those derived from hydroxycarboxylic acids or lactones, such as 12-hydroxystearic acid and E-caprolactone. In the above processes, a monomeric precursor of the polyester may be used in place of the prepared polyester, whereby the polyester is formed in situ and directly converted into the surfactant. Suitable precursors of the polyester are hydroxycarboxylic acids and lactones. Suitable compounds containing the acid group are alpha-amino- or alpha-hydroxy-alkane carboxylic acids, such as glycine and glycollic acid and amino- and hydroxy-organic sulphonic or phosphonic acids, such as aminoethane sulphonic acid, suitable precursors of the acid group are phosphorus pentoxide and sulphonyl chloride and suitable bifunctional compounds, which can form a linking group between the polyester and the acid group, are polyamines, polyols and hydroxyamines.

(i) Surfactant of First Preferred Species

The oil-soluble monocarboxylic acid of Formula II, the residue of which forms the hydrophobic component of the first preferred species of the first aspect of the invention, may be prepared by the interesterification of one or more monohydroxymonocarboxylic acids together with a monocarboxylic acid free from hydroxyl groups which acts as a chain terminator. The hydrocarbon chains $A^2$, $B^1$ and $B^2$ may be linear or branched. $A^2$ is preferably an alkyl group containing up to 25 carbon atoms, for example a straight-chain $C_{17}H_{35}$-group derived from stearic acid. $B^1$ is preferably a straight-chain alkyl group, and $B^2$ is preferably a straight-chain alkylene group; for example, the unit containing $B^1$ and $B^2$ may be derived from 12-hydroxy-stearic acid.

The hydroxyl group in the monohydroxymonocarboxylic acid, and the carboxyl group in either carboxylic acid, may be primary, secondary or tertiary in character. Suitable hydroxycarboxylic acids for use in the first stage include glycollic acid, lactic acid, hydracrylic acid, 6-hydroxycaproic acid, ricinoleic acid and, more especially 12-hydroxystearic acid. The non-hydroxylic carboxylic acid which acts as a chain terminator, and hence as a means of regulating the molecular weight of the complex monocarboxylic acid, may be, for example, acetic acid, propionic acid, caproic acid, stearic acid or an acid derived from a naturally occurring oil, such as tall oil fatty acid. Commercial quantities of 12-hydroxystearic acid normally contain up to 15% of stearic acid, and other non-hydroxy acids as impurities and can conveniently be used without further admixture to produce a polymer of molecular weight about 1500–2000. Where the non-hydroxylic monocarboxylic acid is separately introduced, the proportion which is required in order to produce a polymer or oligomer of a given molecular weight can be determined either by simple experiment or by calculation.

The interesterification of the monohydroxymonocarboxylic acid and the non-hydroxylic monocarboxylic acid may be effected by heating the starting materials in a suitable hydrocarbon solvent such as toluene or xylene, which is able to form an azeotrope with the water produced in the esterification reaction. The reaction is preferably carried out in an inert atmosphere, e.g. of nitrogen, at a temperature of up to 250° C., conveniently at the refluxing temperature of the solvent. Where the hydroxyl group is secondary or tertiary the temperature employed should not be so high as to lead to dehydration of the acid molecule. Catalysts for the esterification, such as p-toluene sulphonic acid, zinc acetate, zirconium naphthenate or tetrabutyl titanate, may be included, with the object of either increasing the rate of reaction at a given temperature or of reducing the temperature required for a given rate of reaction.

The hydrophobic component mentioned above may conveniently be linked to the hydrophilic component by reacting the compound of Formula II with one or more appropriate co-reactants capable of reacting with the free carboxyl group therein. The carboxyl group reacts readily with compounds containing, for example, hydroxyl or amino groups and therefore one way in which the surfactants of the invention may be made is by reacting the compound of Formula II with a compound which has in the molecule at least one hydroxyl or amino group and also at least one acid group. Examples of such compounds, where the acid group present in the hydrophilic component of the surfactant is a carboxyl group, include amino-acids such as glycine and short-chain hydroxy acids such as glycollic acid or lactic acid.

Another way in which the surfactants may be produced is by an indirect, two-stage process in which the compound of Formula II is reacted with a linking compound containing at least one reaction group such as a hydroxyl or amino group and at least one other reactive group, and the intermediate product so obtained is then reacted with a compound containing the acid group and a group capable of combining with the other reactive group in the linking compound. Suitable linking compounds include polyols, polyamines and hydroxyamines, as examples of which there may be mentioned ethylene glycol, propylene glycol, glycerol, trimethylol propane, pentaerythritol, sorbitol, ethylene diamine, trimethylene diamine, hexamethylene diamine, diethylene triamine, ethanolamine, diethanolamine, dipropanolamine and tris(hydroxymethyl)aminomethane. Hydroxyamines are appropriate linking compounds since, because of the difference in reactivity of the hydroxyl and amino groups, it is easier to avoid the formation of double-ended or oligomeric intermediate products. Suitable compounds containing the acid group and another reactive group, with which the intermediate products are then reacted, include strong inorganic acids such as phosphoric acid, sulphuric acid, chlorosulphonic acid and sulphamic acid, and organic acids such as alkyl- and aryl-phosphonic acids, alkyl- and aryl-sulphonic acids and monochloracetic acid.

In preparing the surfactant from the compound of Formula II the reaction of the latter with the compound containing the acid group (in the direct route) or with the linking compound (in the indirect route) is carried out under conditions which are appropriate for the reactants involved. Thus, in the case where the compound of Formula II is reacted directly with a functional acid such as glycine or glycollic acid the reactants may be heated together at a temperature in the range 180°–260° C., if desired in the presence of a solvent such as xylene and optionally also in the presence of a catalyst such as zirconium octoate or tetrabutyl titanate, until the acid value of the mixture has fallen to the appropriate level. The reactants are used in approximately stoichiometric proportions with respect to the carboxyl group in the compound of Formula II and the hydroxyl or amino group in the compound bearing the acid group. Similar conditions apply, in the case of the indirect route, to the reaction between the compound of Formula II and the linking compound, except that only one reactive group in the latter is taken into account in order to ensure that the intermediate product still contains at least one grouping available for subsequent reaction with the compound bearing the acid group. Where the linking compound is a hydroxyamine, a reaction temperature in the range 150°–200° C. may suffice. Here again, an inert solvent or diluent and/or a catalyst may be present if desired.

In the second stage of the indirect route, the intermediate product is reacted with the compound containing the acid group at a temperature and for a period of time sufficient for completion of the reaction as indicated by the attainment of a substantially constant acid value of the reaction mixture. Where the compound containing the acid group is a polybasic acid such as phosphoric acid or sulphuric acid, it is preferred that only one of the ionisable hydrogen atoms therein is reacted and that no attempt is made to remove water of reaction; it is found that reaction for about 3 hours at a temperature in the range 40°–70° C. is usually adequate, more stringent conditions introducing the risk of dehydration of the product, especially where sulphuric acid is used. These complications do not arise in the case of monochloracetic acid, but the reaction proceeds more slowly and rather more forcing conditions may be required. In general, the compound containing the acid group is used in an approximately stoichiometric amount with respect to the available reactive groups in the intermediate product (taking into account the above-mentioned preference in the case of a polybasic acid), but a lower or higher amount than this may be used if desired.

The final products of the preparative procedures outlined above are all acidic in character and may, if desired, be stored and used as surfactants in that form. They may, however, alternatively be neutralised with ammonia, organic bases such as amines or aminoalcohols, or inorganic bases before storage or use.

(ii) Surfactant of Formula III

The surfactant of Formula III, in which Y is a direct link, may be prepared by reaction of a polyester having a terminal carboxylic acid group with an amino- or hydroxy-organic sulphonate or phosphonate, and preferably an amino- or hydroxy-alkyl sulphonate or phosphonate. The surfactant of Formula III in which Y is $NR^1$ or oxygen, can be prepared by reaction of the same polyester with a diol, a diamine or with an aminoalcohol and subsequently reacting the intermediate formed in the first stage with a phosphating agent, such as phosphorus pentoxide, or a sulphating agent, such as chlorosulphonic acid.

According to a fifth aspect of the present invention there is provided a process for the preparation of a compound according to Formula III, wherein Y is a direct link, which comprises reacting a polyester of the formula $$A^3—CO—(O—B^3—CO)_m—OH \qquad V$$

with a compound of the formula:

$$(H—X—G)_k—L\ M \qquad VI$$

wherein $A^3$, $B^3$, X, G, L, M, k and m have the same meanings as in Formula III.

According to a sixth aspect of the present invention there is provided a process for the preparation of a compound according to Formula III in which Y is O or NR which comprises reacting a polyester of Formula V with a compound of the formula:

$$H—X—G—Y—H \qquad VII$$

and subsequently with a sulphating or phosphating agent.

In a modification of the processes forming the fifth and sixth aspects of the present invention the compound of Formula VI or Formula VII is added to the precursors of the polyester of Formula V, i.e. a mixture of the compounds $A^3$—COOH and HO—$B^3$—COOH or the lactone of HO—$B^3$—COOH, under polymerising conditions, whereby the polyester of Formula V is formed in situ and is converted directly into the compound of Formula III.

(iii) Surfactant of Formula IV

The surfactant of Formula IV may be prepared by polymerising a hydroxycarboxylic acid or lactone in the presence of a monohydric alcohol, or a primary or secondary monoamine, to form a polyester having a terminal hydroxy group and reaction of the hydroxy-terminated polyester with a phosphating, such as phosphorus pentoxide or a sulphating agent, such a chlorosulphonic acid.

According to a seventh aspect of the present invention there is provided a process for the preparation of a compound according to Formula IV which comprises polymerising a hydroxycarboxylic acid of the formula:

$$HOOC—B^3—OH \qquad VIII$$

or a lactone thereof, in the presence of a monohydric alcohol of the formula, $D^1OH$ or a primary or secondary amine of the formula $D^1NH_2$ or $D^1RNH$, and reacting the product with a phosphating or sulphating agent wherein $B^3$, $D^1$ and R are as hereinbefore defined.

EXAMPLES OF THE INVENTION

The invention is further illustrated by the following examples in which all parts and percentages are by weight unless otherwise indicated.

Intermediate 1

This is poly(12-hydroxystearic acid) having an acid value of 35 mg.KOH/g prepared by the process for "Polyester A" in UK Patent Specification No 1,373,660.

Intermediate 2

A mixture of 3206 g of ricinoleic acid and 6 g of tetrabutyl titanate was stirred at 170°–175° C. under a stream of inert gas. The acid value of the reaction mixture was determined at intervals and after 17 hours, when the acid value was 34 mg.KOH/g, reaction was stopped by cooling the reaction mixture to room temperature. The product is hereinafter called Intermediate 2.

Intermediate 3

A mixture of 500 g of E-caprolactone, 67 g of dodecanol and 0.1 g of tetrabutyl titanate was stirred at 160°–180° C. under a stream of nitrogen for 19 hours. The reaction mass was then discharged and allowed to solidify to a waxy solid, hereinafter referred to as Intermediate 3.

Intermediate 4

This was prepared in the same manner as Intermediate 3 except that the quantity of dodecanol was reduced to 32.6 g and the reaction time was reduced to 6 hours. The waxy product is hereinafter referred to as Intermediate 4.

Intermediate 5

This was prepared in the same manner as Intermediate 3 except that the quantity of dodecanol was reduced to 16.0 g and the reaction time was reduced to 6 hours. The waxy product is hereinafter referred to as Intermediate 5.

Intermediate 6

A mixture of 2968.8 g of commercial 12-hydroxystearic acid and 325.5 g of xylene was charged to a round-bottom flask fitted with a stirrer and a Dean and Stark separator. With an atmosphere of nitrogen being maintained throughout, the mixture was heated with stirring to reflux temperature (180°–190° C.) and kept at that temperature for about 1 hour, with the addition of more xylene if necessary to ensure removal of water of condensation. With the source of heat temporarily removed, there was then added, into the middle of the reaction mixture by means of a pipette, 5.61 g of tetrabutyl titanate and heating under reflux was resumed until the acid value of the mixture had fallen to the range 30–36 mg KOH/g. The product had a solids content of 90.1% and is hereinafter referred to as Intermediate 6.

Intermediate 7

This was prepared in the same manner as Intermediate 3 except that the quantities of E-caprolactone and dodecanol used were 250 g and 51 g respectively. The waxy product is hereinafter referred to as Intermediate 7.

Intermediate 8

This was prepared in the same manner as Intermediate 3 except that the quantities of E-caprolactone and dodecanol used were 250 g and 90 g respectively. The soft waxy product is hereinafter referred to as Intermediate 8.

Intermediate 9

This was prepared in the same manner as Intermediate 3 except that the quantities of E-caprolactone and dodecanol used were 22.6 g and 100 g respectively. The very soft waxy product is hereinafter referred to as Intermediate 9.

Intermediate 10

A mixture of 153 g of E-caprolactone, 87 g of n-octanol and 0.1 g of tetrabutyl titanate was stirred at 160°–180° C. under a stream of nitrogen for 10 hours. The reaction mass was then discharged, and is hereinafter referred to as Intermediate 10.

Intermediate 11

A mixture of 355 g of E-caprolactone, 50 g of dodecylamine and 0.1 g of tetrabutyl titanate was stirred at 170°–180° C. under a stream of nitrogen for 8 hours. The reaction mass was then discharged, and is hereinafter referred to as Intermediate 11.

Fluidising Agent 1

This is the product described as Agent B in UK 1,508,576.

EXAMPLE 1

Solution A was prepared by mixing 26.4 g of a 48.6% aqueous sodium hydroxide solution and 100 g of water, and then dissolving 39 g of aminoethane sulphonic acid in the mixture.

Solution B was prepared by mixing 500 g of Intermediate 1 and 43 g toluene until the mixture was homogeneous.

Solution B was transferred to a flask equipped with a gas inlet tube and a Dean and Stark water separator. Solution A was added to the flask over 5 minutes while the contents were stirred rapidly. Stirring was continued while heating was applied, and initially all the water was removed in the Dean and Stark separator. Toluene was then distilled off until the temperature of the reaction mass rose to 180° C. The reaction mass was then stirred at 180°–190° C. for 5 hours under a stream of inert gas, after which the reaction was stopped by cooling the reaction mixture to room temperature. The reaction product, hereinafter called Surfactant 1, had an acid value of 7.4 mg.KOH/g.

EXAMPLE 2

This preparation was carried out in exactly the same way as Example 1, except that Solution A was prepared from 2.5 g of a 48.6 w/w % aqueous sodium hydroxide solution, 25 g of water and 3.8 g of aminoethane sulphonic acid, and Solution B was prepared from 50 g of Intermediate 2 and 21.7 g of toluene.

The final stage of the reaction was carried out at 180° C. for 5½ hours. The reaction product, hereinafter called Surfactant 2 had an acid value of 5.9 mg.KOH/g.

EXAMPLE 3

Solution A was prepared by mixing 7.58 g of a 46.6% aqueous sodium hydroxide solution and 19.9 g of water then dissolving 12.5 g of aminoethane sulphonic acid in the mixture.

Solution B was prepared by mixing 136.8 g of E-caprolactone and 21.7 g toluene until the mixture was homogeneous.

Solution B was transferred to a flask equipped with a gas inlet tube and a Dean and Stark water separator. Solution A was added to the flask over 5 minutes while the contents were stirred rapidly. Stirring was continued while heating was applied, and initially all the water was removed in the Dean and Stark separator. At this stage some solid was deposited on the sides of the flask. Toluene was then distilled off until the temperature of the reaction mass rose to 180° C., and during this period the solid re-dissolved giving a homogeneous reaction mass. The mass was then stirred for 7 hours at 170°–190° C. under a stream of inert gas, after which the reaction was stopped by cooling the reaction mixture to room temperature. Infra-red spectroscopy showed that almost no unreacted E-caprolactone was then present. The reaction product was a waxy solid, hereinafter called Surfactant 3.

EXAMPLE 4

317 g of Intermediate 3 was stirred at 60°–65° C. and 10 g of phosphorus pentoxide was then added gradually over 30 minutes. The temperature was then raised to 90° C., and the reaction mass stirred for a further 16 hours at this temperature. It was then discharged and allowed to solidify to give a waxy solid, hereinafter called Surfactant 4.

EXAMPLE 5

The process of Example 4 was repeated except that the 317 g of Intermediate 3 was replaced by 317 g of Intermediate 4 and the quantity of phosphorus pentoxide was reduced to 5 g. The product was a waxy solid, hereinafter called Surfactant 5.

EXAMPLE 6

The process of Example 4 was repeated except that the 317 g of Intermediate 3 were replaced by 317 g of Intermediate 5 and the quantity of phosphorus pentoxide was reduced to 2.5 g. The product was a waxy solid, hereinafter called Surfactant 6.

EXAMPLE 7

115 g of Intermediate 3 were stirred at 60° C. and 8.83 g of chlorosulphonic acid added gradually over 10 minutes. The mixture was then stirred for 16 hours at 65°–75° C. when the acid value was 45 mg.KOH/g. The reaction mass was then discharged and allowed to solidify to a waxy solid, hereinafter called Surfactant 7.

EXAMPLE 8

A blend of 390 g of Intermediate 6 and 13.37 g of monoethanolamine was heated with stirring in a round-bottom flask at 150° C. under an atmosphere of nitrogen for a period of 6 hours, water of reaction being removed via a Dean and Stark separator. At the end of this period 29.5 g of 83% phosphoric acid was added and stirring was continued at 40° C. for 3 hours, without removal of water of reaction.

The final product was a 98.1% solids solution of anionic surfactant having an acid value of 58.6 mg KOH/g, hereinafter called Surfactant 8.

EXAMPLE 9

The procedure of Example 8 was repeated, but using the following reactants in place of those used in Example 8, 381.1 g of poly(12-hydroxystearic acid), 22.5 g of diethanolamine and 58.9 g of 83% phosphoric acid. The product was a 96.4% solids solution of anionic surfactant having an acid value of 88.8 mg KOH/g hereinafter referred to as Surfactant 9.

EXAMPLE 10

The procedure of Example 9 was repeated, but replacing the 83% phosphoric acid by 47.2 g of 98% sulphuric acid and employing a reaction temperature of 70° C. in the second stage. The product was a 96.3% solids solution of anionic surfactant having an acid value of 149.5 mg KOH/g, hereinafter referred to as Surfactant 10.

EXAMPLE 11

A blend of 300 g of poly(12-hydroxystearic acid) and 12.9 g of glycine was heated with stirring at 200° C. under an atmosphere of nitrogen for a period of 6 hours, water of reaction being removed via a Dean and Stark separator. The product was a 90.4% solids solution of anionic surfactant having an acid value of 21.6 mg.KOH/g, hereinafter called Surfactant 11.

EXAMPLE 12

A blend of 300 g of poly(12-hydroxystearic acid) and 15.8 g of glycerol was heated under an atmosphere of nitrogen for a period of 6 hours, water of reaction being removed as in Example 11. There was then added 20.8 g of 83% phosphoric acid and heating was continued at 70° C. for 3 hours without removal of water of reaction. The product was a 92.3% solids solution of anionic surfactant of acid value 53.1 mg KOH/g, hereinafter referred to as Surfactant 12.

EXAMPLE 13

A blend of 300 g of poly(12-hydroxystearic acid) and 20.9 g of tris(hydroxymethyl)aminomethane was heated with stirring for 6 hours at 190° C. under an atmosphere of nitrogen, water of reaction being removed as in Example 11. There was then added 67.8 g of 83% phosphoric acid and heating was continued at 70° C. for 3 hours without removal of water of reaction. The product was a 92.2% solids solution of anionic surfactant having an acid value of 130.8 mg KOH/g, hereinafter referred to as Surfactant 13.

EXAMPLE 14

A blend of 300 g of poly(12-hydroxystearic acid) and 13.1 g of glycollic acid was heated with stirring at 215° C. under a nitrogen atmosphere for 6 hours, with removal of water of reaction. The product was a 95.7% solids solution of anionic surfactant of acid value 29.2 mg KOH/g, hereinafter referred to as Surfactant 14.

EXAMPLE 15

The process of Example 4 was repeated except that 105 g of Intermediate 3 and 5 g of phosphorus pentoxide were used. The product was a waxy solid, hereinafter called Surfactant 15.

EXAMPLE 16

The process of Example 4 was repeated except that 317 g of Intermediate 3 were replaced by 211 g of Intermediate 7. The product was a waxy solid, hereinafter called Surfactant 16.

EXAMPLE 17

The process of Example 4 was repeated except that the 317 g of Intermediate 3 were replaced by 148 g of Intermediate 8. The product was a waxy solid, hereinafter called Surfactant 17.

EXAMPLE 18

The process of Example 4 was repeated except that the 317 g of Intermediate 3 were replaced by 100 g of Intermediate 9, and the quantity of phosphorus pentoxide was increased to 11.5 g. The product was a soft waxy solid, hereinafter called Surfactant 18.

EXAMPLE 19

75.6 g of Intermediate 10 were stirred at room temperature and 10 g of phosphorus pentoxide were added gradually over 30 minutes. The temperature was then raised to 90° C., and the reaction mass stirred for a further 16 hours at this temperature. It was then discharged and the product, a very viscous liquid, is hereinafter called Surfactant 19.

EXAMPLE 20

106 g of Intermediate 11 were stirred at 50°–55° C. and 5 g of phosphorus pentoxide were added gradually over 45 minutes. The temperature was then raised to 90° C., and the reaction mass stirred for a further 4 hours at this temperature. It was then discharged and the product, a waxy solid, is hereinafter called Surfactant 20.

EXAMPLES 21 TO 44

The 24 dispersions, having the formulations described in Table 1 were prepared by ball-milling the ingredients for 16 hours. All the dispersions were fluid and deflocculated, with pigment particles having a mean diameter below 5 microns.

TABLE 1

| Example | Pigment & amount | | Surfactant & Amount | | Organic liquid & Amount | |
|---|---|---|---|---|---|---|
| 21 | Red 57:2 | 4.0 g | 1 | 0.20 g | SBP3 | 5.80 g |
| 22 | Red 57:2 | 4.0 g | 1 | 0.20 g | Toluene | 5.80 g |
| 23 | Yellow 34 | 7.5 g | 1 | 0.37 g | Xylene | 2.13 g |
| 24 | White 6 | 7.0 g | 2 | 0.35 g | SBP3 | 2.65 g |
| 25 | Yellow 34 | 7.0 g | 2 | 0.35 g | SBP3 | 2.65 g |
| 26 | Red 57:2 | 3.0 g | 2 | 0.90 g | SBP3 | 6.10 g |
| 27 | Yellow 34 | 7.0 g | 3 | 0.35 g | MIBK | 2.65 g |
| 28 | White 6 | 7.0 g | 3 | 0.35 g | 2-EOEA | 2.65 g |
| 29 | Blue 15:3 | 2.5 g | 1 | 0.50 g | SBP3 | 7.00 g |
| 30 | Red 168 | 4.0 g | 1 | 0.40 g | SBP3 | 5.60 g |
| 31 | White 6 | 7.0 g | 4 | 0.35 g | 2-EOEA | 2.65 g |
| 32 | Yellow 42 | 7.0 g | 4 | 0.35 g | MIBK | 2.65 g |
| 33 | White 6 | 5.0 g | 15 | 0.25 g | TCE | 4.75 g |
| 34 | White 6 | 7.0 g | 15 | 0.35 g | PA | 2.65 g |
| 35 | Red 101 | 6.0 g | 5 | 0.3 g | BA | 3.7 g |
| 36 | White 6 | 5.0 g | 6 | 0.35 g | PA | 4.65 g |
| 37 | White 6 | 6.0 g | 7 | 0.3 g | BA | 3.7 g |
| 38 | Red 104 | 6.0 g | 16 | 0.3 g | MOPA | 3.7 g |
| 39 | White 6 | 6.0 g | 17 | 0.3 g | BA | 3.7 g |
| 40 | White 6 | 6.0 g | 18 | 0.3 g | BA | 3.7 g |
| 41 | White 6 | 6.0 g | 19 | 0.3 g | BA | 3.7 g |
| 42 | White 6 | 6.0 g | 20 | 0.3 g | BA | 3.7 g |
| 43 | White 6 | 6.0 g | 15 | 0.3 g | CH | 3.7 g |
| 44 | White 6 | 5.0 g | 1 | 0.25 g | TCE | 4.75 g |

Abbreviations in Table 1
SBP3 petroleum fraction boiling between 100 and 120° C.
MIBK methyl-iso-butyl ketone.
2-EOEA 2-ethoxyethyl acetate.
MOPA 1-methoxy-2-propyl acetate.
TCE trichloroethylene.
PA n-propyl acetate.
BA n-butyl acetate.
CH cyclohexanone.

EXAMPLE 45

A dispersion was prepared according to the method of Example 21 using the following ingredients:

| | |
|---|---|
| Pigment Blue 15:3 | 3.0 g |
| Fluidising Agent 1 | 0.6 g |
| Surfactant 1 | 0.3 g |
| SBP3 | 6.1 g |

The dispersion was fluid and deflocculated with pigment particles having a mean diameter below 5 microns.

EXAMPLES 46 TO 49

Four dispersions having the general formulation:

| | |
|---|---|
| Dispersed Solid | 80 g |
| Surfactant 1 | 4 g |
| EXSOL D 200/240 | 116 g | were prepared by bead milling the ingredients for 30 minutes with 1 mm glass beads using the solids listed in Table 2. All the dispersions were fluid and deflocculated with particles having mean diameters below 5 microns. EXSOL D 200/240 is a mixed aliphatic/naphthenic solvent available from Exxon Corporation and EXSOL is a trade mark.

TABLE 2

| Example | Dispersed Solid |
|---|---|
| 46 | Flutriafen |
| 47 | Carbendazim |
| 48 | Chlorothalonil |
| 49 | Mancozeb |

EXAMPLE 50

A mixture of 2.0 g of Surfactant 8 and 178.0 g of diesel oil was heated to 50° C. and stirred until it became homogeneous. To this solution was added 20.0 g of demineralised water whilst the total material was being passed through a "Silverson" mixer running at slow speed. When the addition of the aqueous phase was complete, emulsification was continued at full speed for 3 minutes.

The 10/90 water-in-oil emulsion thus obtained was of good stability, showing no more than slight oil separation and no water break after storage at room temperature for 24 hours.

EXAMPLE 51

A water-in-oil emulsion was prepared as described in Example 50 using Surfactant 9 in place of Surfactant 8. The resulting emulsion was of similar stability to that of Example 50.

EXAMPLE 52

A water-in-oil emulsion was prepared as described in Example 50, except that, after dissolution of the product in the diesel oil and prior to emulsification, there was added to the aqueous phase 0.03 g of 0.880 sp.gr. aqueous ammonia, bringing the pH of that phase to 7.0. The resulting emulsion was of similar stability to that of Example 50.

EXAMPLE 53

A mixture of 1.0 g of Surfactant 11 and 4.0 g of ISOPAR L (an essentially iso-paraffinic hydrocarbon fraction: ISOPAR is a Registered Trade Mark) was heated to 70° C. and stirred until the mixture became homogeneous. This solution was then added slowly to 95.0 g of demineralised water whilst the total material was being passed through a "Silverson" mixer running at low speed. The mixer was then switched to full speed and isopropylaminoethanol was added to the emulsion until the pH of the latter was brought to 9.2. Emulsification was then continued at high speed for 3 minutes.

The resulting emulsion had good stability, showing only slight creaming at the surface after storage at room temperature for 24 hours.

EXAMPLE 54

Surfactant 12 was used to make an oil-in-water emulsion as described in Example 53, except that diesel oil was used in place of ISOPAR L and the pH of the oil phase after addition of isopropylaminoethanol was 9.7. The resulting emulsion had good stability, showing only slight creaming at the surface after storage at room temperature for 72 hours.

EXAMPLE 55

Surfactant 13 was used to make an oil-in-water emulsion as described in Example 54, except that the pH of the oil phase after addition of isopropylaminoethanol was 8.7. The resulting emulsion had similar stability to that of Example 54.

EXAMPLE 56

A mixture of 1.15 g of Surfactant 14 and 4.0 g of paraffinic mineral oil was heated to 70° C. and stirred until the mixture was homogeneous. This oil phase was then emulsified into 95 g of demineralised water as described in Example 53, the pH of the oil phase after addition of isopropylaminoethanol being 9.7. The resulting emulsion was of similar stability to that of Example 54.

EXAMPLE 57

The 90.4% solids solution of Surfactant 11 was used to prepare a 10/90 water-in-oil emulsion according to the procedure described in Example 50. The resulting emulsion had similar stability to that of Example 50.

EXAMPLE 58

A water-in-oil emulsion was prepared as described in Example 50, but replacing the Surfactant 8 by Surfactant 10, replacing the demineralised water by 20.0 g of 20% aqueous calcium chloride solution, and reducing the amount of diesel oil to 176.0 g.

The resulting emulsion showed similar stability to that of Example 50.

EXAMPLE 59

A water-in-oil emulsion was prepared as described in Example 50 using Surfactant 8, but replacing the demineralised water by 20.0 g of a 20% aqueous calcium chloride solution and adding thereto, prior to emulsification, 0.05 g of 0.880 sp.gr. aqueous ammonia.

The resulting emulsion had similar stability to that of Example 50.

EXAMPLES 60 TO 63

Mixtures of magnetic material, Surfactant 4, resin and solvent, as indicated in Table 3, were premixed using a high-speed stirrer and then subjected to a high energy ball-milling for the time shown in Table 3. Dispersions suitable for use in the manufacture of magnetic media were obtained in this way.

The magnetic materials used were as follows:

Type A A gamma-$Fe_2O_3$ with a surface area of 18.5 $m^2/g$, an oil absorption of 41 ml/100 g and a particle length of 0.4 microns. This is typical of magnetic iron oxides used in audio tapes.

Type B A cobalt-doped gamma-$Fe_2O_3$ with a surface area of 23 $m^2/g$, an oil absorption of 41 g/100 g and a particle length of 0.35 microns. This material which was supplied by Bayer UK Ltd. under the product name BAYFERROX AC 5120M (BAYFERROX is a trade mark) is typical of magnetic iron oxides used in high-bias audio tapes and in video cassette tapes.

Type C A stabilised magnetite with a surface area of 19 $m^2/g$, an oil absorption of 40 g/100 g, and a particle length of 0.45 microns. This material was supplied by Bayer UK Ltd., under the product name BAYFERROX AC 5110M.

Type D A chromium dioxide magnetic material of the type used in computer tapes and video cassette tapes.

The resin was a hydroxylated vinyl chloride/vinyl acetate copolymer obtained from Union Carbide under the trade mark UCAR VAGH.

In the following tables the following abbreviations are used

THF is tetrahydrofuran.

MEK is methyl ethylketone.

TABLE 3

| Example Number | Magnetic material & Amount (g) | Amount of Surfactant 4 (g) | Solvent(s) and Amount (g) | Amount of resin (g) | High energy milling time (minutes) |
|---|---|---|---|---|---|
| 60 | Type A 20.0 | 0.8 | THF 9.3 MEK 9.3 | 0.6 | 60 |
| 61 | Type B 20.0 | 0.8 | THF 9.3 MEK 9.3 | 0.6 | 60 |
| 62 | Type C 20.0 | 0.8 | THF 9.3 MEK 9.3 | 0.6 | 60 |
| 63 | Type D 20.0 | 0.8 | THF 9.3 MEK 9.3 | 0.6 | 60 |

EXAMPLES 60A TO 63A

Each dispersion prepared in Examples 60 to 63 was let down to a lacquer with a 20% w/w solution of a polyurethane (PU) resin in tetrahydrofuran. Typically, the let down was carried out in three stages with approximately equal quantities of PU resin solution each time. Each mixture was subjected to a 5 minute high-energy ball milling after each stage of the let down. The resultant lacquer was then further let down with solvent and the mixture subjected to a further 5 minutes high-energy ball milling. Table 4 identifies the dispersions, the weights of PU resin solution and of solvent used in the let down; the let down solvent was a 1:1 mixture of tetrahydrofuran and methylethylketone. The PU resin used was obtained from B. F. Goodrich Inc. under the name ESTANE 5701-F1 (ESTANE is a trade mark).

TABLE 4

| Example or CE Number | Dispersion used | Amount of 20% PU resin solution (g) | Amount of solvent used (g) |
|---|---|---|---|
| 60A | Ex. 60 | 22 | 14.92 |
| 61A | Ex. 61 | 22 | 14.92 |
| 62A | Ex. 62 | 22 | 14.92 |
| 63A | Ex. 63 | 22 | 14.92 |

Magnetostatic Evaluations

Each lacquer was discharged from the ball-mill and used to coat to roll of 12 micron thick biaxially-oriented polyester film.

The coating was carried out using a mechanised wire-wound K-bar (Meyer Bar) draw-down system. The K-bar was calibrated to leave a wet film of thickness 50 microns. The machine was modified so that a powerful permanent magnet mounted about 1.5 cm above the polyester film followed the motion of the K-bar. In this way a strong magnetic field passed across the wet-film before any appreciable solvent evaporation had taken place. The film was then allowed to dry by solvent evaporation.

Samples of coated films were then evaluated by conventional techniques on a vibrating-sample magnetometer. Table 5 reports the magnetic parameters of coated films determined by this evaluation technique.

The magnetic parameters determined were coercivity (in Oersteds), squareness (Br/Bs) and Magnetic Orientation Ratio (OR). Coercivity and squareness are parallel to the direction of travel of the magnet over the film.

TABLE 5

| Example Number | Coercivity (Oersteds) | Squareness (Br/Bs) | Orientation Ratio |
| --- | --- | --- | --- |
| 60A | 426 | 0.79 | 2.30 |
| 61A | 678 | 0.76 | 1.82 |
| 62A | 450 | 0.58 | 1.08 |
| 63A | 765 | 0.63 | 1.33 |

We claim:

1. A compound of the formula:

$$MOSO_2—(O—B—CO)_m—X—D^1$$

wherein

M is a cation;

B is alkylene, alkenylene, cycloalkylene or polycycloalkylene, each containing from 3 to 24 carbon atoms with at least 3 carbon atoms directly between the —O— and —CO— groups and is unsubstituted or substituted by a chloro, hydroxy, amino or alkoxy;

m is from 2 to 75;

X is O or NR;

R is H, alkyl, alkenyl, cycloalkyl or phenyl; and $D^1$ is selected from the group consisting of H, a hydrocarbon group and a hydrocarbon group substituted by chloro, hydroxy, amino or alkoxy containing up to 50 carbon atoms.

2. A compound according to claim 1 wherein:

M is $H^+$, an alkali metal cation or an ammonium ion;

B is $C_{5-20}$-alkylene or $C_{5-20}$-alkenylene;

m is a number from 2 to 75;

X is O or NR in which R is H, $C_{1-5}$-alkyl or $C_{1-5}$-alkenyl; and $D^1$ is selected from the group consisting of alkyl, alkenyl, hydroxyalkyl, hydroxyalkenyl, cycloalkyl or polycycloalkyl containing up to 35 carbon atoms.

3. A compound of the formula:

$$MOSO_2—(O—B—CO)_m—D$$

wherein m is a cation,

B is a hydrocarbon group m is from 2 to 75; and

D is the residue of an alcohol, primary amine secondary amine, or $D_1$—XR in which, $D_1$ is an aliphatic or alicyclic group;

X is O or NR; and

R is H, alkyl, alkenyl, cycloalkyl or phenyl.

4. A compound according to claim 3 wherein each of B and $D_1$ contain up to 50 carbon atoms.

5. A compound according to claim 3 wherein B contains at least 3 carbon atoms.

6. A compound according to claim 3 wherein B is alkylene or alkenylene containing from 5 to 20 carbon atoms.

7. A compound according to claim 3 wherein $D_1$ is alkyl or alkenyl containing up to 35 carbon atoms.

8. A compound according to claim 3 wherein $D^1$ is selected from the group consisting of methyl, ethyl, decyl, dodecyl, hexadecyl and octadecyl.

9. A compound according to claim 3 wherein B is selected from the group consisting of pentamethylene, 1-octylnon-1,9-ylene, 1-hexyl-undec-1,11-ylene, 1-nonyl-oct-1,8-ylene and 1-hexyl-dodec-3-en-1,12-ylene.

10. A dispersible or emulsifiable composition of:

(1) (a) a solid selected from the group consisting of pigments, fillers, dyestuffs, optical brightening agents, magnetic metal, magnetic oxides, solids for oil-based and invert-emulsion drilling muds, biocides, agrochemicals and pharmaceuticals; or (b) a water-immiscible organic liquid, and (2) a compound according to claim 1 or claim 3.

11. A compound of the formula:

$$MOSO_2—(O—B—CO)_m—O—D$$

wherein:

M is a cation;

B is a substituted or unsubstituted alkylene, alkenylene, cycloalkylene or polycycloalkylene group of a hydroxycarboxylic acid residue having at least 3 and not more than 50 carbon atoms and $$(O—B—CO)_m—O—D$$

forms a polyester which can be derived from a hydroxycarboxylic acid of the formula:

$$HO—B—COOH$$

and a monohydric alcohol of formula D—OH;

D is an alcohol residue; and m is 2 to 75.

* * * * *